United States Patent [19]
Marshall et al.

[11] Patent Number: 5,489,923
[45] Date of Patent: *Feb. 6, 1996

[54] METHOD AND APPARATUS FOR CALIBRATING AN OPTICAL COMPUTER INPUT SYSTEM

[75] Inventors: Roger N. Marshall, Solana Beach; Lane T. Hauck, San Diego; Leonid Shapiro, Lakeside; Jeffrey W. Busch, San Diego; Eric S. Stevens, El Cajon, all of Calif.

[73] Assignee: Proxima Corporation, San Diego, Calif.

[*] Notice: The term of the patent shall not extend beyond the expiration date of Pat. No. 5,181,015.

[21] Appl. No.: 154,817

[22] Filed: Nov. 19, 1993

Related U.S. Application Data

[60] Continuation of Ser. No. 955,831, Oct. 2, 1992, abandoned, which is a division of Ser. No. 611,416, Nov. 9, 1990, Pat. No. 5,181,015, which is a continuation-in-part of Ser. No. 433,029, Nov. 7, 1989, abandoned.

[51] Int. Cl.⁶ ..................................... G09G 5/00
[52] U.S. Cl. .......................... 345/156; 345/158; 356/375
[58] Field of Search .................... 345/156, 157, 345/158, 87, 7, 8; 434/323, 324, 337; 356/375; 353/122, 28, 43; 248/170, 181

[56] References Cited

U.S. PATENT DOCUMENTS

| | | | |
|---|---|---|---|
| 3,855,096 | 5/1975 | Inuiya | 340/709 |
| 4,280,135 | 7/1981 | Schlossberg | 358/93 |
| 4,576,481 | 3/1986 | Hansen | 356/375 |
| 4,724,480 | 2/1988 | Hecker et al. | 356/375 |
| 4,794,430 | 12/1988 | Whittaker et al. | 340/782 |
| 4,808,980 | 2/1989 | Drumm | 340/707 |
| 4,836,671 | 6/1989 | Bautista | 356/375 |
| 4,846,694 | 7/1989 | Erhardt | 340/707 |
| 4,886,230 | 12/1989 | Jones et al. | 248/170 |
| 4,930,888 | 6/1990 | Freisleben | 340/705 |

Primary Examiner—Richard Hjerpe
Assistant Examiner—Xiao M. Wu
Attorney, Agent, or Firm—Bernard L. Kleinke; Jerry R. Potts

[57] ABSTRACT

A method and apparatus facilitates the alignment and light sensitivity adjustment of an optical computer input system, which includes a user generated light directed onto a screen bearing a computer generated image, to convey information to the computer interactively by the user, even in a darkened room. The system discriminates between the user generated image, and the computer generated image. Devices facilitate the proper alignment of the system with the screen, as well as proper light sensitivity adjustments.

19 Claims, 12 Drawing Sheets

SPECTRAL RADIANCE
SEC PEAK @ 664 nm

SPECTRAL RADIANCE
SEC. PEAK @ 640 nm

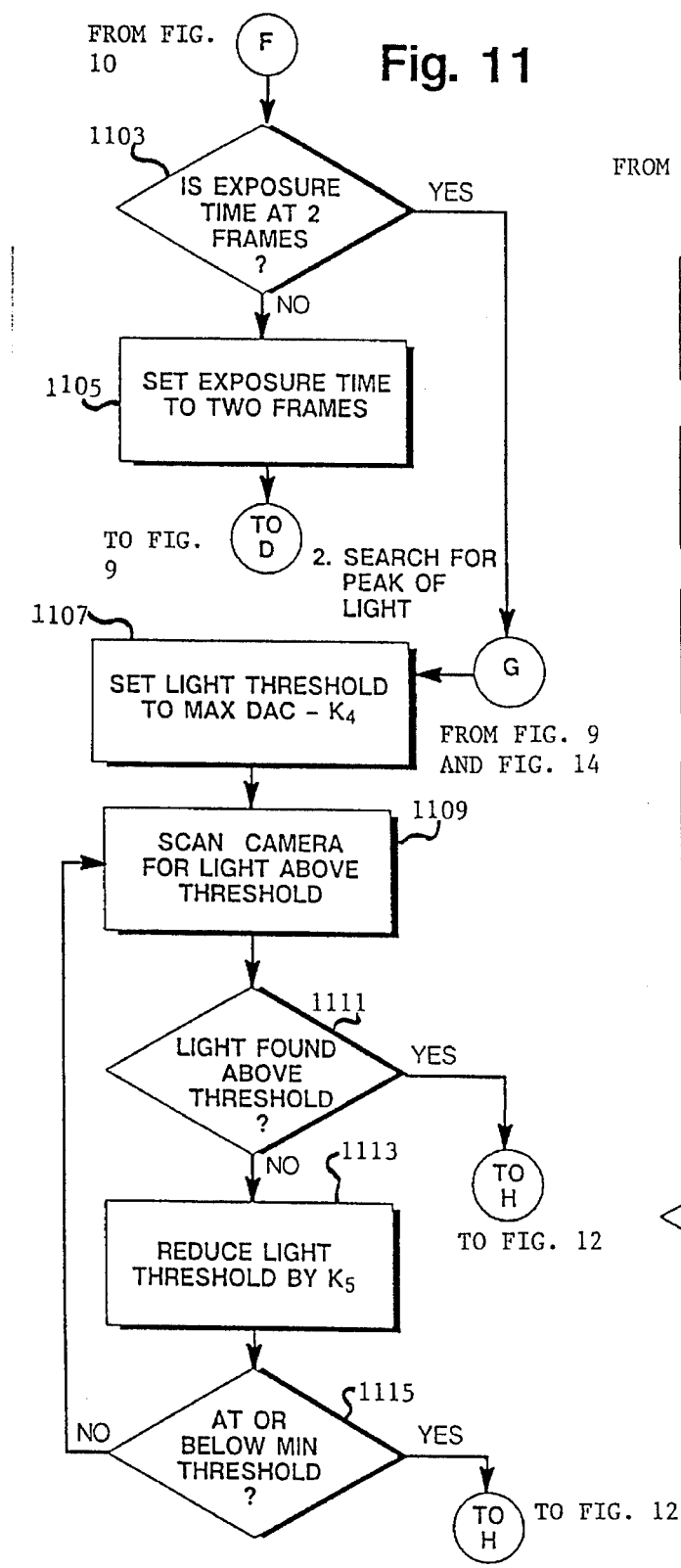
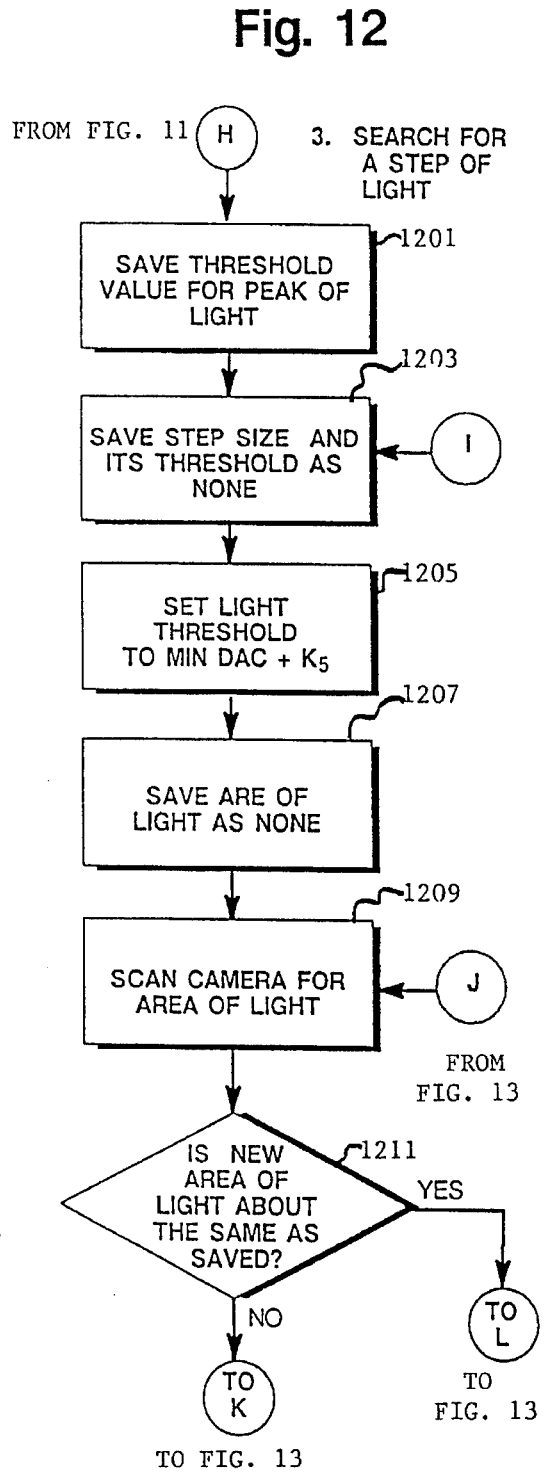

Fig. 13

FROM FIG. 12 → (K)

1301: WAS ABOUT THE SAME AREA OF LIGHT FOUND FOR MORE THAN 1 THRESHOLD? — NO → (to L path)
YES ↓

1303: IS THE SAVED LIGHT AREA WITHIN MAX AND MIN LIMITS? — NO →
YES ↓

1305: IS THIS STEP OF LIGHT LARGER THAN SAVED STEP? — NO →
YES ↓

1307: SAVE NEW STEP'S SIZE AND THE THRESHOLD AT THE MID POINT OF STEP.

↓

1309: INCREASE LIGHT THRESHOLD BY $K_6$
← (L) FROM FIG. 12 TO FIG. 9

↓

1311: IS THRESHOLD AT OR ABOVE SAVED PEAK THRESHOLD? — YES → (TO M) TO FIG. 14
NO ↓
(TO J) TO FIG. 12

Fig. 14

(M) FROM FIG. 13

↓

1401: WAS A STEP OF LIGHT FOUND? — YES → (TO N) TO FIG. 15
NO ↓

1403: TRIED TO FIND A STEP OF LIGHT FOR $K_7$ # OF TIMES? — NO → (TO G) TO FIG. 11
YES ↓

1405: TOGGLE EXPOSURE TIME BETWEEN 2 AND 4 FRAMES

↓

1407: TRIED TO FIND A STEP OF LIGHT AT BOTH EXPOSURES? — NO → (TO B) TO FIG. 9
YES ↓

1409: MAKE A SOUND TO INFORM USER THAT THERE IS TOO MUCH LIGHT OR CAMERA NEEDS TO MOVE

METHOD AND APPARATUS FOR CALIBRATING AN OPTICAL COMPUTER INPUT SYSTEM

CROSS-REFERENCE TO RELATED APPLICATIONS

This is a continuation, of application Ser. No. 07/955,831, now abandoned, filed on Oct. 2, 1992, which is a division of 07/611,416, filed on Nov. 9, 1990, now U.S. Pat. No. 5,181,015, which is a continuation in part of Ser. No. 07/433,029, filed on Nov. 7, 1989, now abandoned.

TECHNICAL FIELD

This invention relates to the general field of optical computer input system calibration apparatus, and the method of using such apparatus. More particularly, the present invention relates to an optical computer input system calibration apparatus and calibration method, to facilitate accurate communication of user generated information carried by light waves to a computer, which can then utilize the information for facilitating the display of computer generated images.

BACKGROUND ART

There have been many different types and kinds of computer input devices for entering information into a computer. Certain ones of such devices have enabled users to enter information, such as control information, without the use of a keyboard. Such devices include absolute positioning devices such as light pens and digitizing tablets, as well as relative positioning devices such as joysticks, track balls and mouse devices.

While such prior known accessory input devices may have been satisfactory for some applications, it has been proven to be highly desirable to be able to employ such input devices in an interactive mode with a computer, being used with a projector, such as a conventional overhead projector, to generate video images on a large screen for viewing by an audience. In this regard, when the computer generated images are projected onto a screen in a darkened room, it has been desirable to enable the user to enter information interactively into the computer to modify images, or generate additional images during the presentation. For example, it has been found to be highly desirable to underline or otherwise highlight the images projected onto the screen, or, in general, to select images for display in a nonsequential order.

However, such conventional input devices, such as a mouse device, is not convenient to use during a presentation in a darkened room. Thus, a new optical computer input, system has been employed. Such system enables the user to shine a high intensity light onto the screen bearing a computed generated image, to provide auxiliary information for the computer. In this regard, such an input system includes an optical sensing device, such as a charge coupled device camera focused onto the screen. Thus, the system can detect the high intensity light images, and discriminate them from the computer generated images, to input information interactively into the computer, in a convenient manner, even in very low ambient light conditions.

Such an optical system is described in greater detail, in the above mentioned copending parent U.S. patent Ser. No. 07/433,029.

While such a computer input system and method of using it, have proven to be highly satisfactory, it would be desirable to facilitate the initial calibration of the system. Such calibration includes proper alignment of the system, such that the viewing area of the light sensing device or camera of the system, is positioned properly to capture the entire displayed projected computer video image. Such alignment is desirable, because the viewing screen of the system may be positioned at various desired distances and angular positions relative to the system light sensing device.

Also, the calibration of such a system entails sensitivity adjustments. Such adjustments are frequently necessary to accommodate for various different projector light source intensities, as well as various different optical arrangements employed in conventional overhead projectors. Thus, different illumination levels for projected images are possible, and the optical input device requires adjustment of optical sensitivity to the projected image.

Another form of light sensitivity calibration necessary for such an optical computer input system, is the calibration of the system such that it can properly distinguish between background light, and light from the high intensity user controlled light. In this regard, because of variations in ambient background lighting, as well as various different intensity levels of projected high intensity light produced by the projection system, it is desirable to distinguish properly the various light sources, and light images, from the user generated light image, so that the system can properly respond to light information conveyed when the user directs the high intensity light onto the same screen as the computer generated images, for modifying or changing them.

Therefore, it would be highly desirable to have a new and improved apparatus and method to calibrate the alignment and light sensitivity of an optical computer input system. Such an apparatus and method should enable a user to align conveniently the system optical sensing device or camera to capture substantially the entire viewing area of a projected image. The apparatus and method should also enable the light sensitivity of the system to be adjusted so that it can easily distinguish various levels of light, whether produced from a computer generated image, or a user generated light image used to entire user generated information into the computer interactively, even in a darkened room.

DISCLOSURE OF INVENTION

Therefore, it is the principal object of the present invention to provide a new and improved apparatus and method for calibrating interactively an optical computer input system for alignment and light sensitivity.

Briefly, the above and further objects of the present invention are realized by providing a new and improved apparatus and method for calibrating an optical computer input system for alignment and light sensitivity.

A method and apparatus facilitates the alignment and light sensitivity of an optical computer input system, which includes a user generated light directed onto a large screen bearing a computer generated image, to convey information to the computer interactively by the user, even in a darkened room. The system discriminates between the user generated image, and the computer generated image. Devices facilitate the proper alignment of the system with the screen, as well as proper light sensitivity adjustments.

The system includes a light sensing device or camera having a raster scan field of view for defining an area of detection. The raster scan field of view includes an area sufficiently larger than the area of a computer generated video image projected onto a screen or other viewing surface area, adjacent to and surrounding the reflected video, images. A blooming device controls the sensitivity of the light sensing device to the presence of light, for helping to facilitate the detection of the edge portions of a video image reflected from the viewing surface.

Also, in order to provide additional sensitivity adjustments, a refresh adjustment, and an ambient background light adjustment, are provided. Additionally, an optical bandpass filter tuned to the user generated light, is used to increase light sensitivity to the user generated light, as compared to the computer generated light.

For the purpose of enabling a user to align the raster scan field of view relative to the viewing surface, the apparatus also includes a position indicating device with light emitting indicator devices to assist the user in determining the extend of misalignment. In this regard, devices are provided to scan the computer generated image, and to determine it is disposed entirely within the light sensing device viewing area.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIGS. 9 to 19 are flow diagrams of the software for the calibration apparatus of FIG. 1.

BEST MODE FOR CARRYING OUT THE INVENTION

Figure 1:
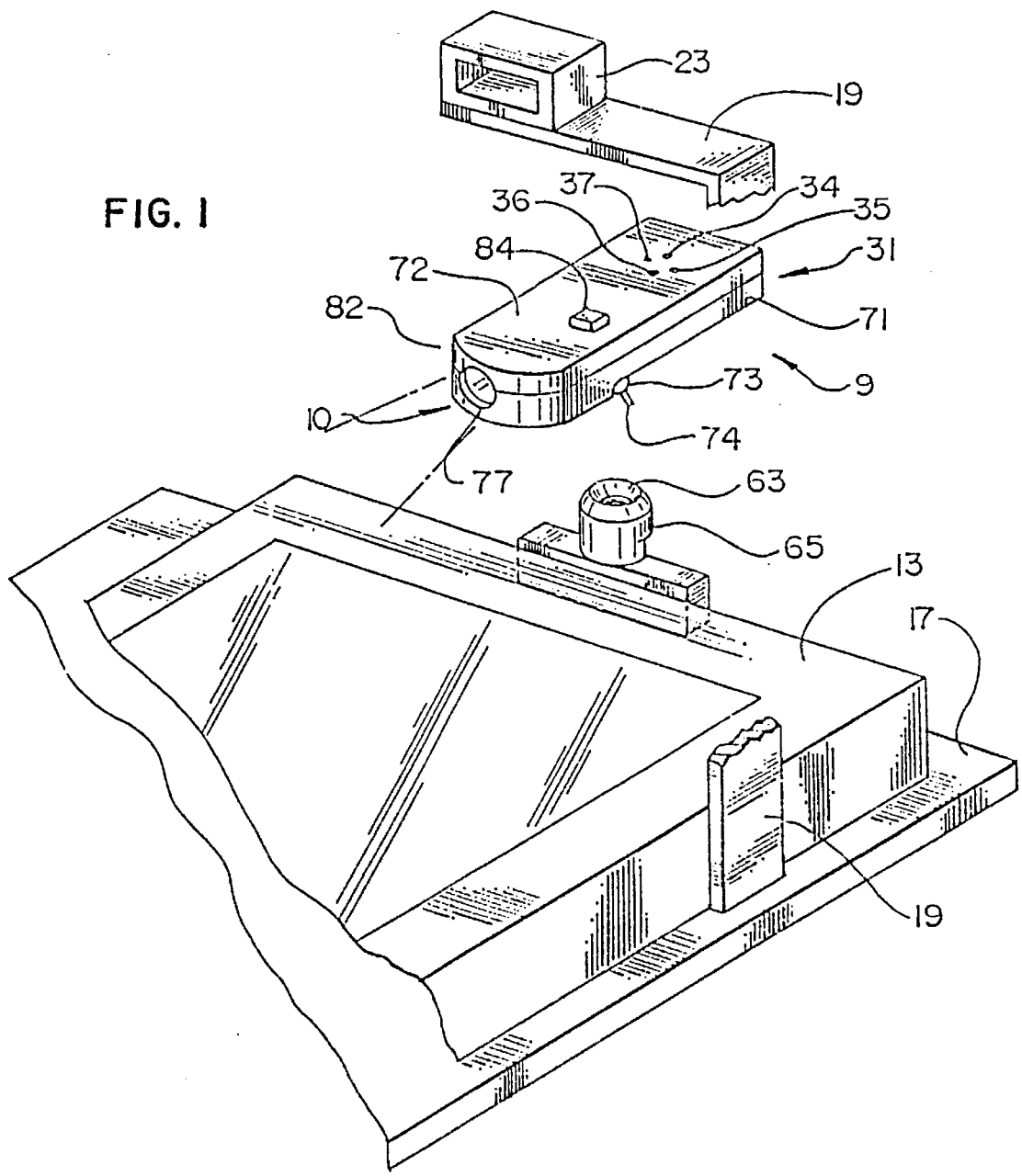
FIG. 1 is a pictorial partially broken away, exploded view of a calibration apparatus, which is constructed according to the present invention, and which is illustrated being mounted on a liquid crystal display panel positioned on an overhead projector for projecting computer generated images.
Figure 2:
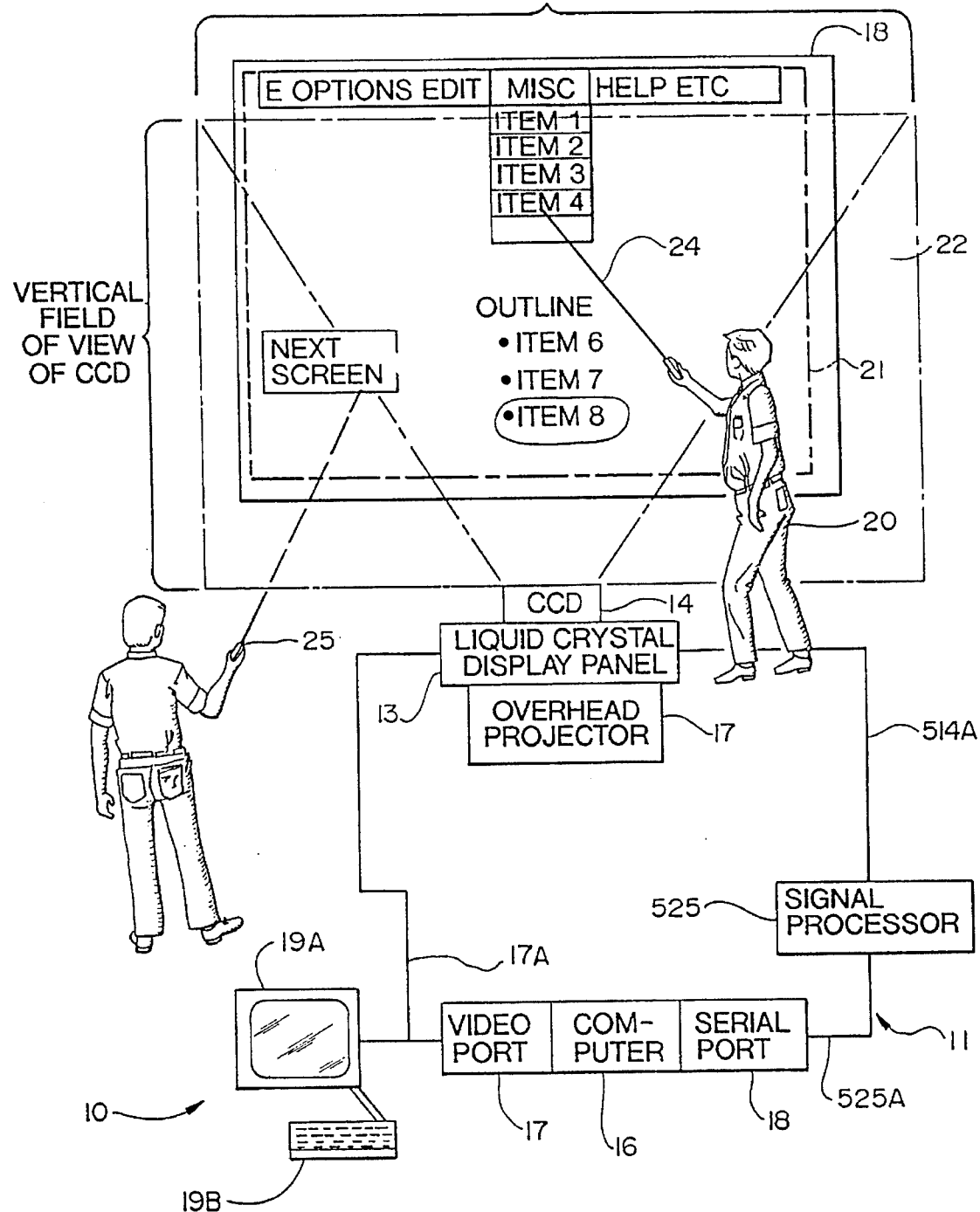
FIG. 2 is a partially diagrammatic view of the calibration apparatus of FIG. 1 illustrating its use.

Referring now to the drawings, and more particularly to FIGS. 1–3 and 5, thereof, there is illustrated a calibration apparatus 9 which calibrates the operation of an optical computer input system generally indicated at 10 as best seen in FIG. 2, and which is constructed in accordance with the present invention. The computer input system 10 is more fully described in the above mentioned U.S. patent application Ser. No. 07/433,029 and includes a liquid crystal display panel 13 for displaying computer generated video images produced by a personal computer 16. In this regard, the panel 13 is driven by the computer 16 for generating light images, which are projected by an overhead projector 17 onto a viewing surface, such as a screen 18. The overhead projector 17 includes a projection lens arm 19 for supporting a projection lens box 23 above the panel 13.

Figure 5:
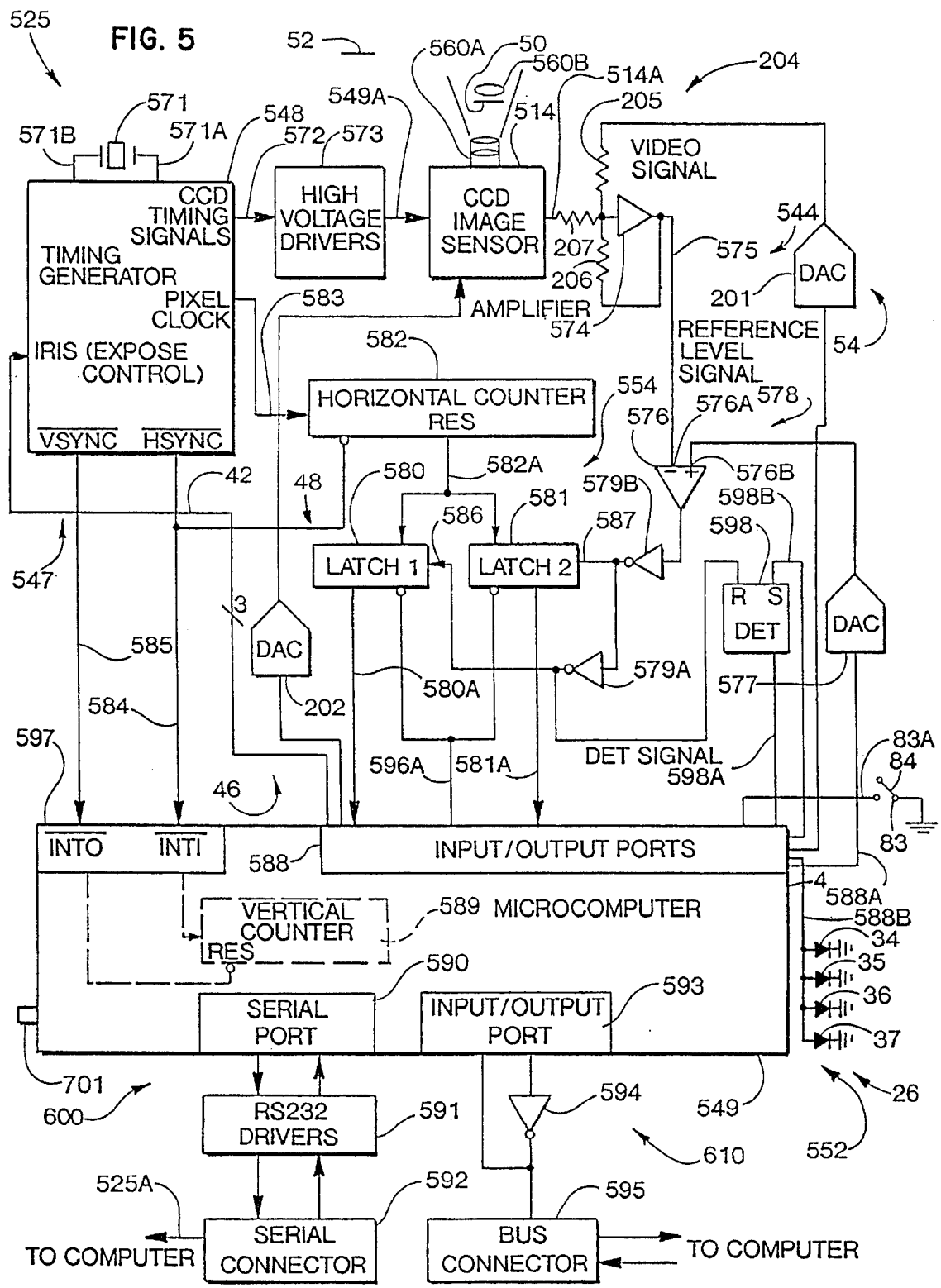
FIG. 5 is a symbolic block diagram of a control system of the calibration apparatus of FIG. 1 illustrating it coupled to a signal processing unit of an optical computer input system for the panel of FIG. 1.

The computer input system 10 includes an image projection arrangement 13 (FIG. 2) whose input path is coupled to the output video port of the computer 16 via a cable 17A. The image detection arrangement 11 generally comprises a charge coupled device image sensor or camera 14 which is coupled to the computer 16 via a signal processing unit 525 (FIG. 5). As best seen in FIG. 2, the signal processing unit 525 is coupled between the output path of the image detection arrangement 11 via a cable 514A and the serial port of the computer 16 via a cable 525A.

The computer input system 10 further includes a light wand or light generating pointing device 24, or a laser light generating device 25 (FIG. 2), sold by Navitar under the tradename POCKET LASER. The device 24 generates an auxiliary light image which may be directed by a user 20 (FIG. 2) to a designated portion or portions of the computer controlled video images displayed on the projection screen or viewing area 18.

The image detection arrangement 11 detects the presence of light reflecting from the screen 18 as well as the normal background light in the area where the input system 10 is disposed. In this regard, the image sensor. 14 generates an analog electrical signal in response to the detection of light, which is coupled to the signal processing unit 525 via a cable 514A. The signal processing unit 525 responds to the analog signal, and converts the signal into digital pixel coordinate reference signals which identify the relative position of an auxiliary light image on the screen 18 produced by device 24. The pixel coordinate reference signals are transmitted to the computer 16 via the output cable 525A. Computer 16 responds to the pixel coordinate signals, and can alter its application program which causes the computer controlled images being projected onto the screen 18. For example, the computer controlled images being projected onto the viewing area 18 can be modified in accordance with the information contained in the coordinate reference signals. The computer input system 10 is more full described in the above referenced U.S. patent application Ser. No. 07/433,029 and will not be described in further detail herein.

Figure 3:
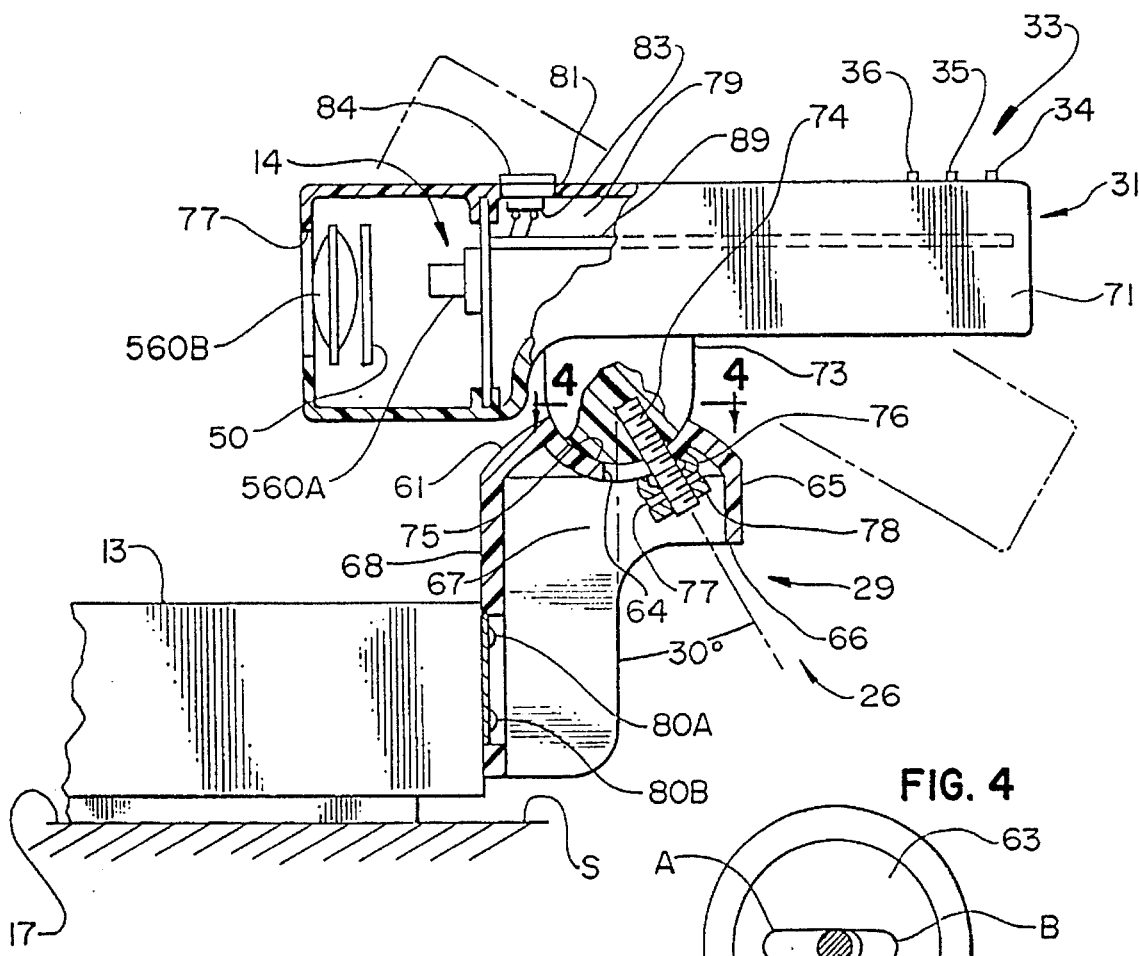
FIG. 3 is a partially cut-away sectioned view of the calibration apparatus of FIG. 1.
Figure 4:
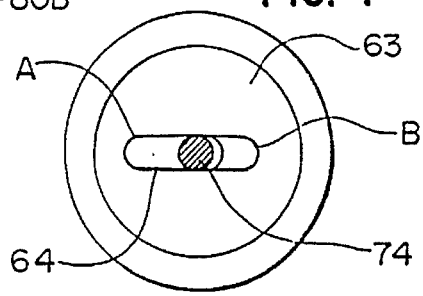
FIG. 4 is a sectional view of the calibration apparatus of FIG. 1 taken substantially along line 4—4 thereof.

As best seen in FIGS. 3, 4 and 5, the calibration apparatus 9 generally comprises a user interactive alignment arrangement 26 for detecting when the viewing area of the image sensor 14 is not in proper alignment with the computer controlled video image reflecting from the viewing surface 18, and for providing a user with a directive visual indication for how to achieve a proper alignment. The alignment arrangement 26 comprises a support unit 29 for mounting the image sensor 14 in a housing 31 in a suitable manner so that the normal field of view of the image sensor 14 is able to receive light reflecting from the viewing surface 18. The alignment arrangement 26 also include a positioning indicator 33 for providing a user with a visual indication for adjusting the pitch and yaw of the image sensor so that its field or view is able to receive light reflecting from the viewing surface 18. The positioning indicator 33 is coupled to the signal processing unit 525 by leads 588B (FIG. 5) and includes a set of four light emitting diodes 34–37. The diodes 34–37 are mounted to the housing 31 in a generally diamond shaped configuration. Each diode, such as diode 34, is separately controlled by the signal processing unit 525 for giving a visual indication to a user for adjusting the pitch and yaw of the housing 31 for alignment purposes.

As shown in FIG. 5, for the purpose of controlling the sensitivity of the image sensor 14 to various luminance levels of light the calibration apparatus 9 also includes a sensitivity arrangement, shown generally at 46. The sensitivity arrangement 46 comprises a blooming control unit 48 which is coupled between the image sensor 14 and a microprocessor 549. The microprocessor 549 forms part of the signal processing unit 525 and is controlled by an adaptive algorithm firmware 700. The algorithm firmware 700 controls the refresh rate (exposure time) and blooming level (sensitivity) of the image sensor 14 so that sensor 14 is able to generate a video signal having a sufficient differential-between background light and light reflecting from the viewing surface 18 to detect light generated by device 24.

As shown in FIG. 5, in order to allow the image sensor 14 to improve its signal to noise ratio for detecting light generated by the devices 24 and 25, the sensitivity arrangement 46 also includes an optical band pass filter 50. As will be explained hereinafter in greater detail, filter 50 is used with and is tuned to the light generating devices 24 and 25. As shown in FIG. 5, an alternative filter 52 can also be used with both devices 24 and 25 (FIG. 2) and is tuned thereto.

As shown in FIG. 5, for the purpose of controlling the video output signal of the image sensor 14 to differentiate between ambient background light and light reflecting from the viewing surface 18, the calibration apparatus also includes an offset circuit, shown generally at 54. The offset circuit 54 is coupled to the microprocessor 549 for the purpose of allowing the offset circuit 54 to be controlled by the algorithm firmware 700 (FIGS. 9–19) in microprocessor 549.

In operation, after the system 10 has been set up, for presentation purposes, a user 20 (FIG. 2), will generally point the housing 31 toward the viewing surface 18. The user then activates the calibration apparatus 9 by depressing a button 38 disposed on the top of the housing 31. When the user presses the button 38, the microprocessor 549 sends an initiation signal to the display panel 13 which responds by clearing the visual image from the screen 18 so that a bright, clear white rectangle of light is reflected from the viewing surface 18. Alternatively, microprocessor 549 could send such a signal to the computer 16. When the display panel 13 has cleared the screen, a signal is returned to the microprocessor 549 in the signal processing unit 525 for causing an initiation signal which starts the algorithm firmware 700.

As best seen in FIG. 2, the field of view of the image sensor 14, shown generally at 22 is misaligned with the video image 21 projected on the screen 18. In this regard, the upper portion of the video image 21 is positioned above the upper portion of the field of view 22 of the image sensor 14. As will be explained hereinafter in greater detail, the firmware program 700 will cause a visual indication to be given to the user 20 of this misalignment. Such a visual indication is also instructive directing the user 20 to raise the front of the housing 31 to permit the field of view 22 to be extended above the video image shown generally at 21.

Stated otherwise, if the field of view of the image sensor 14, shown generally at 22, does not include all of the reflected visual image produced by the computer 16, one or more of the light emitting diodes 34–37 (FIGS. 1 and 5) will be actuated to prompt the user 20 to reorient the housing 31 for alignment purposes. For example, as shown in FIG. 2, light emitting diode 36 could be actuated prompting the user 20 to increase the pitch of housing 31 so that the field of view of the image sensor 14 would include the top portion of the image produced by computer 16, shown generally at 21. As the user 20 increases the pitch of the housing 31, the light emitting diode 36 will be turned off when the top most portion of the image 21 is within the field of view 22. The algorithm firmware 700 will continue to cause the LEDs 34–37 to be actuated providing prompting directions to the user for achieving a proper alignment.

Once a proper alignment of the image sensor viewing field 22 has been achieved, the algorithm firmware 700 causes all four light emitting diodes 34–37 to be extinguished and to send a signal to the display panel 13. When the display panel 13 receives the signal, the display panel once again causes the normal visual image to be displayed on the screen 18. Once the display panel has caused a visual image to be displayed, the microprocessor 549 uses the algorithm firmware 700 to adjust the contrast or sensitivity level of the system 10. In this regard, the algorithm firmware 700 causes the sensitivity arrangement 46 to set the background level, blooming level and exposure time of the image sensor device 14 to optimum levels for the purpose of viewing the projected light.

The microprocessor via the algorithm firmware 700 then determines the peak value of the projected light for normal display conditions. Once the peak detected level for the projected light for a normal display condition has been determined, the algorithm firmware proceeds to set the threshold level for a spot of light. As a final step, the algorithm causes a sound indication to be given to the user by a speaker, not shown, for the purpose of registering the projected image with respect to the charge coupled device camera image. In response to the sound condition, the user employs the pointing device 24 to reflect a high intensity light from the viewing surface 18 at the edges of the projected image screen. The microprocessor 549 in cooperation with the algorithm firmware 700 then adjust the threshold level to distinguish between the computer generated video signals produced by the video information light and the video information produced by the light pointing device 24.

Should any one of the above described adjustments fail to produce a satisfactory calibration, the microprocessor causes a distinctive alarm signal to be generated for the purpose of informing the user that the calibration procedure has not been successfully completed. In this regard, the user then makes an appropriate adjustment by, for example, lowering the background light. Once the user has made the necessary adjustment, the calibration procedure is once again initiated and repeated allowing the calibration to be completed.

Considering now the alignment arrangement 26 in greater detail with reference to FIGS. 1–5, the support unit 29 generally comprises a support unit top portion 61 for receiving a ball 73 which is integrally connected to the underside of a base portion 71 to the housing 31. The top portion 61 is mounted on the LCD panel 13 at the rear side wall thereof (FIGS. 1 and 3) and includes a socket 63 which is adapted to receive and support the ball 73 in a universal manner to permit the housing 31 to be adjusted positionally relative to the screen 18. The top portion 61 is integrally connected to a side wall portion 65 which is generally tubular in shape. The side wall 65 extends downwardly from the top portion 61 terminating in a circumferential lip shown generally at 66 for defining an interior cavity 67. The cavity 67 is sufficiently large, that a user may easily have access thereto. A back wall portion 68 is integrally connected to a portion of the side wall portion 65 for defining a mounting surface between the support unit 29 and the panel 13. The back wall portion 68 includes a pair of holes 70A and 70B adapted to receive a pair of screws 80A and 80B respectively for securing the back wall portion 68 of the support unit 29 to the panel 13.

It should be understood that, while the housing 31 is shown and described to be mounted to the LCD panel, the housing could alternatively be mounted to other portions of the panel or the projector. It can also be used in a free standing mode of operation, by a suitable modification, as will become apparent to those skilled in the art.

Considering now the top portion 61 in greater detail with reference to FIGS. 3 and 4, the socket 63 includes a base with an elongated slot 64 which extends in an arcuate manner extending longitudinally at the base of the socket. Slot 64 is adapted to receive a threaded rod 74 depending from the bottom portion of ball 73. The rod 74 depends from a base portion or bottom most portion 75 of the ball inclined from the vertical by an angle of approximately 30°. In this regard, when the rod 74 is disposed within the slot 64, the ball 73 can move along a path defined by the slot 64.

As best seen in FIGS. 3 and 4, when the rod 74 has traversed to its furthest point forwardly, as shown at A in FIG. 4, the base portion of housing 31 is positioned inclined upwardly front to rear at an angle of about 30° to the horizontal, as indicated in phantom lines in FIG. 3. In a similar manner, when the rod 74 is disposed at its opposite furthest rearward point of travel within slot 63 as shown at B in FIG. 4, the housing 31 is generally horizontal, as shown in solid lines in FIG. 3. From the foregoing it should be understood that the socket 63 and ball 73 in cooperation with the slot 64 and rod 74, permit a 30° up and down pitch movement of the housing 31 between a 0° horizontal reference, and an upwardly inclined position disposed at about 30° to the horizontal as indicated in phantom lines in FIG. 3, as well as being infinitely variable therebetween. This pitch movement allows the field of view of the image sensor 14 to be adjusted relative to the viewing surface 18.

In order to secure the ball 73 within the socket 63 releasably at an adjusted position, the rod 54 is adapted to receive a cupped washer 76 and nut 78. The spring washer 76 and nut 78 hold the ball 73 snugly in socket 64. A curved washer 77 between washer 76 and hut 78 provides a sufficient resilient force whereby a user may move the rod 74 within the slot 64 for alignment purposes and with a sufficient force to hold the ball 73 and socket 74 in a stationary position when the user releases the housing 31.

Considering now the housing unit 31 in greater detail with reference to FIGS. 1 and 3, the housing unit 31 is generally a rectangularly shaped box having a slightly curved front portion 82. The unit 31 includes the base portion 71 with the integrally connected ball 73 depending therefrom for permitting the housing 31 to rest supportably within support unit 29. The housing unit 31 also includes a top portion 72 which matingly engages the base portion 71 to form a closed hollow interior 79 within the housing 31.

In order to permit lateral or side-to-side positional adjustment of the housing 31 relative to the socket and thus the screen, the ball 73 is free to rotate about the rod 74. Thus, the housing 31 can be positionally adjusted upwardly and downwardly, as well as side to side, in an infinitely and universally adjustable manual manner. Also, as previously explained, the adjusted position is retained releasably.

When the base and top portions 71 and 72 are matingly engaged a centrally disposed hole 77 is formed in the curved front portion 82. Hole 77 defines a viewing window for the image sensor device 14 which is mounted within the hollow interior 79.

The top portion 72 of the housing 31 includes a hole 81 housing a generally rectangularly shape for receiving an actuator switch with a button 84 which extends above the top surface of the top portion 72. The top portion also includes a set of holes 85, 86, 87 and 88 adapted to receive the light emitting diodes 34–37 respectively. The actuator switch 83 and the light emitting diodes 34–37 are connected by conductors 83A and 588B respectively to a printed circuit board 89 mounted within the hollow interior 79 of the housing unit 31 by means not shown. The printed circuit board 89 has the various electronic components mounted thereto forming the signal processing unit 525 and other electric circuits of the apparatus 9.

As best seen in FIG. 3, the image sensor 14 is mounted in the front portion of the housing 31 and includes the filter 50 which is interposed between a pair of lenses 560A and 560B. Lens 560A is the conventional focusing lens of the sensor 14 while lens 560B is a magnifying lens for optimizing the field of view of the sensor 14. The filter 50 and the lenses 560A and B are mounted within the housing 31 by means not shown.

Considering now the sensitivity arrangement 46 in greater detail with reference to FIG. 5, the blooming control unit 48 generally comprises a digital to analog converter 202 coupled between the input/output port 588 of microcomputer 549 and the CCD image sensor 14. The digital to analog converter 202 supplies a bias voltage to the image sensor 14, under the control of the algorithm program 700, for increasing and decreasing the charging capability of the image sensor 14 in response to light. More particularly, the blooming control unit permit the CCD image sensor 14 to amplify differences between bright and dim luminance levels. The manner in which the algorithm program 700 controls the operation of the bloom control unit 48 will be described hereinafter in greater detail.

As best seen in FIG. 5, the image sensor 14 is driven by a set of high voltage drivers controlled by CCD timing signals. For the purpose of controlling the sensitivity of the sensor 14 to various light image intensity levels produced by the overhead projector 17 in cooperation with the computer 16 and panel 13, the microprocessor 549 under the control of the algorithm program 700 generates an IRIS signal which is coupled to the timing generator 548. The IRIS signal causes the CCD timing signals coupled to the image sensor 14 to be changed between a maximum refresh rate of 4 frame periods to a minimum refresh rate of 1 frame period. In this regard, with a maximum refresh rate of 4 frame periods for example, the image sensor 14 ill accumulate more of charge in response to image signals than with a minimum refresh rate of 1 frame period. The IRIS signal thus, causes gross light sensitivity changes for the calibration procedure as will be described hereinafter in greater detail.

Figure 6:
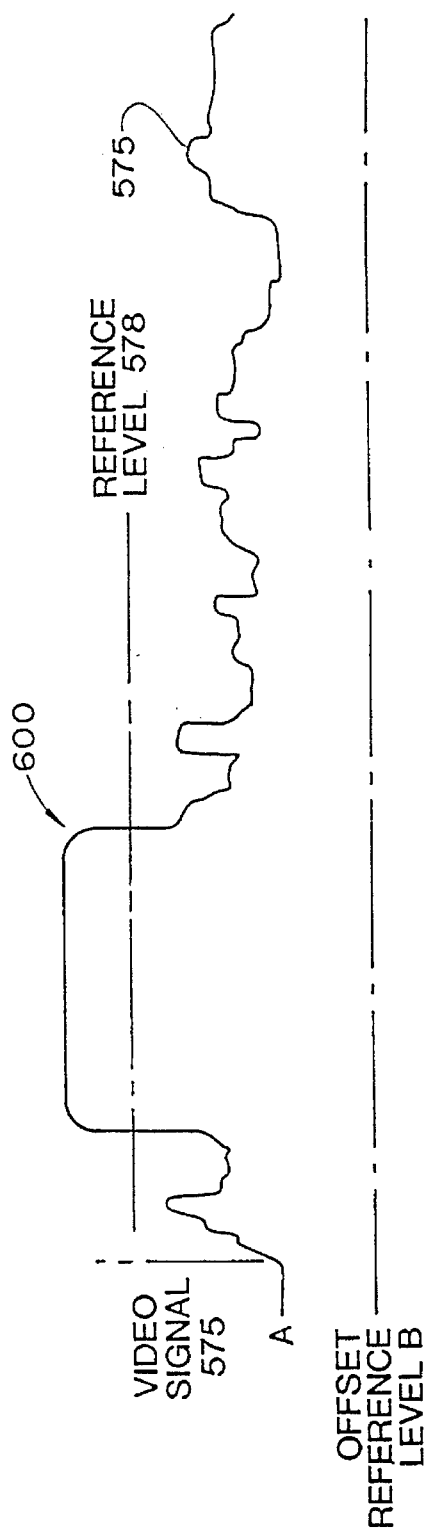
FIG. 6 is a signal diagram helpful in the understanding of the calibration apparatus of FIG. 1.

Considering now the offset circuit 54 in greater detail with reference to FIG. 5, the offset circuit 54 generally comprises a digital to analog converter 201 which is coupled between the input/output ports 588 of the microprocessor 549 and a resistor network 204. The network 204 includes a resistor 205 coupled between the input of amplifier 574 and the output of the digital to analog converter 201, a feedback resistor 206 coupled between the input and the output of video amplifier 574 and a resistor 207 coupled between the output of the image sensor 14 and the input to the video amplifier 574. From the foregoing, it will be understood, that the digital to analog converter 201 supplies a bias or offset voltage to the amplifier 574 for increasing and decreasing the DC level of the video output signal coupled to a comparator 576 in the signal processing unit 525. The digital to analog converter 201 is controlled by the microprocessor 549 under the control of the algorithm program 700 for controlling the DC offset of the video signal in response to background or ambient light. As best seen in FIG. 6, the video signal 575 is referenced to the bias voltage B produced via the analog to digital converter 201 and the resistor network 204 coupled to amplifier 574. The manner in how the algorithm program 700 controls the offset circuit 54 will be described hereinafter in greater detail.

Figure 7:
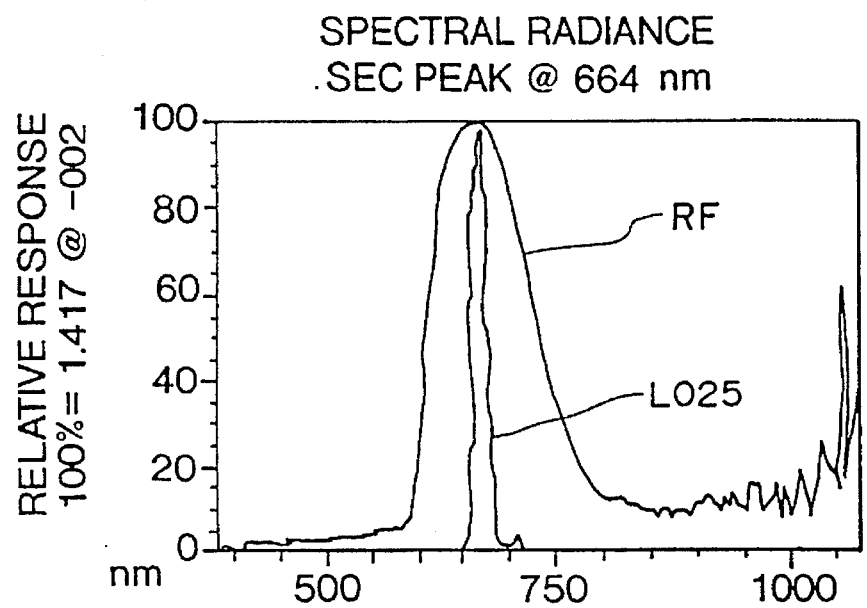
FIG. 7 is a spectral diagram helpful in the understanding of the calibration apparatus of FIG. 1.
Figure 8:
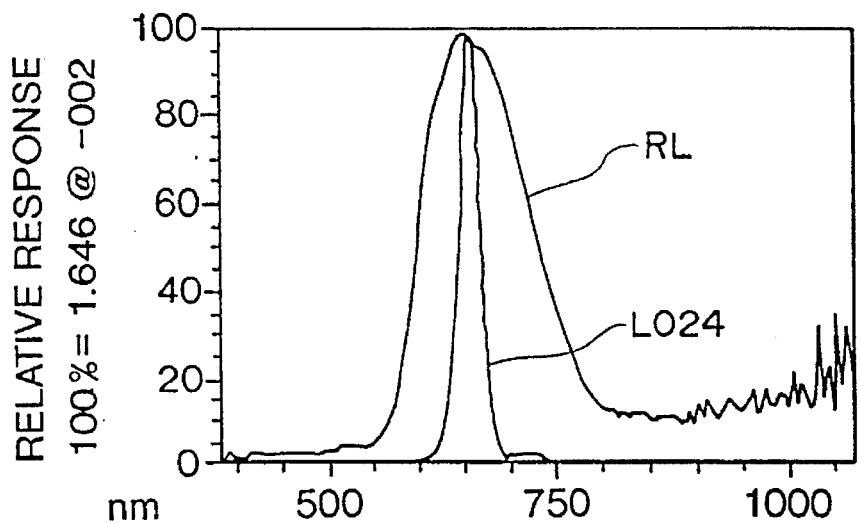
FIG. 8 is a spectral diagram helpful in understanding of the calibration apparatus of FIG. 1.

Considering now the optical filters 50 and 52 in greater detail with reference to FIGS. 3, 7 and 8, the filter 50 is a ruby acetate filter for use with the laser pointer 25 or the LED pointer 24. The filter 50 is placed on front of the image sensor 14 focusing lens (FIG. 3). The filter characteristics are such that it passes a given bandwidth of light and attenuates all other light. FIG. 7 is a graph of the response RF of filter to various wavelength of light. FIG. 7 also illustrates the light output LO25 of the laser pointer 25.

The filter 50 improves the signal to noise ratio of the signals being evaluated for calibration purposes. The filter 50 thus, enables the signal processing unit 525 to better differentiate between the background ambient light and the light generated by pointer 25.

As seen in FIG. 8, an alternative filter 52 may be used as an optical filter. In this regard, filter 52 is a ruby lith filter. The response RL characteristics of filter 52 to various wavelength of light is shown in FIG. 8. FIG. 8 also illustrates the light output LO24 of the LED pointer 24. Tables I and II provide a further detailed description of the respective filter 50 and 52 and pointers 24 and 25.

TABLE I

| FILTER TYPE | LUMINANCE | RADIANCE | C.I.E. 1976 1931 |
|---|---|---|---|
| RUBY ACETATE | 8.896e+001fl 3.048e+002 cd/mz | 2.948e+000 w/sr*mz | x = 0.6140 y = 0.3528 u¹ = 0.4089 v¹ = 0.5287 v = 0.3525 |
| RED LITH | 8.880e+001fl 3.980e+002 cd/me | 2.522e+000 w/sr*mz | x = 0.6194 y = 0.3361 u¹ = 0.4276 v¹ = 0.5220 v = 0.3480 |

TABLE II

| POINTER TYPE | LUMINANCE | RADIANCE | C.I.E. 1976 1931 |
|---|---|---|---|
| LASER POINTER | 2.050E+001F1 7.022E+001 cd/mz | 3.213E+000 w/sr*z | x = 0.6875 y = 0.2888 u¹ = 0.5402 v¹ = 0.5106 v = 0.3404 |
| LED POINTER | 6.420e+001fl 2.200e+002 cd/mz | 3.320e+000 w/sr*mz | x = 0.6937 y = 0.2963 u¹ = 0.5369 v¹ = 0.5160 v = 0.3440 |

Referring now to FIG. 6, an illustrated example of the offset voltage for video amplifier 574 is shown. In this regard, line A is a representation of the video signal output 575 from amplifier 574 when the image sensor 14 is focused on an area of the screen 18 and the light generating device 24 causes a bright spot of light to appear on the screen 18. In this regard, an analog level 600 is generated that is higher in amplitude than the surrounding signal 575 which is also detected by the image sensor 14. As indicated in line B, the reference level voltage signal 578 has been set by the algorithm firmware 700 to detect the light pulse signal 600 and not the background illumination or the computer generated display information is indicated by signal 575. Also as indicated in FIG. 6, the offset reference level voltage B produced by digital to analog convertor 201 under the control of the algorithm firmware 700 is shown. This voltage level may be varied relative to the reference level 578. As will be explained hereinafter in greater detail, the algorithm firmware 700 adjusts the offset reference level B so that the video signals 575 will not exceed the reference level voltage 578 with respect to any background light.

Considering now the algorithm program 700 in greater detail wit reference to FIGS. 9–19, the algorithm program 700 controls the operation of the calibration apparatus 9 interactively and adaptionally with the user 20.

Figures 9, 10:
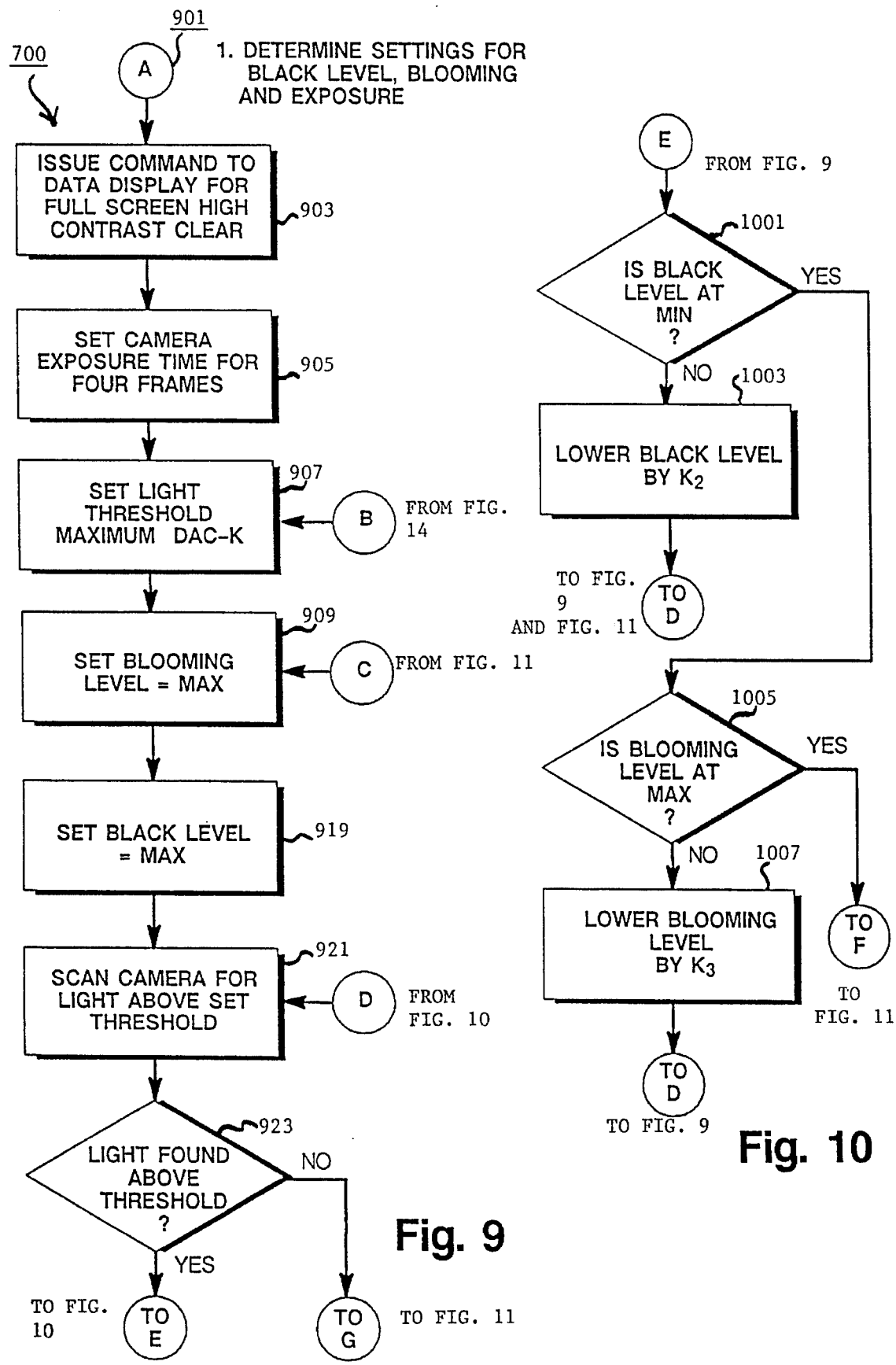
Figure 15:
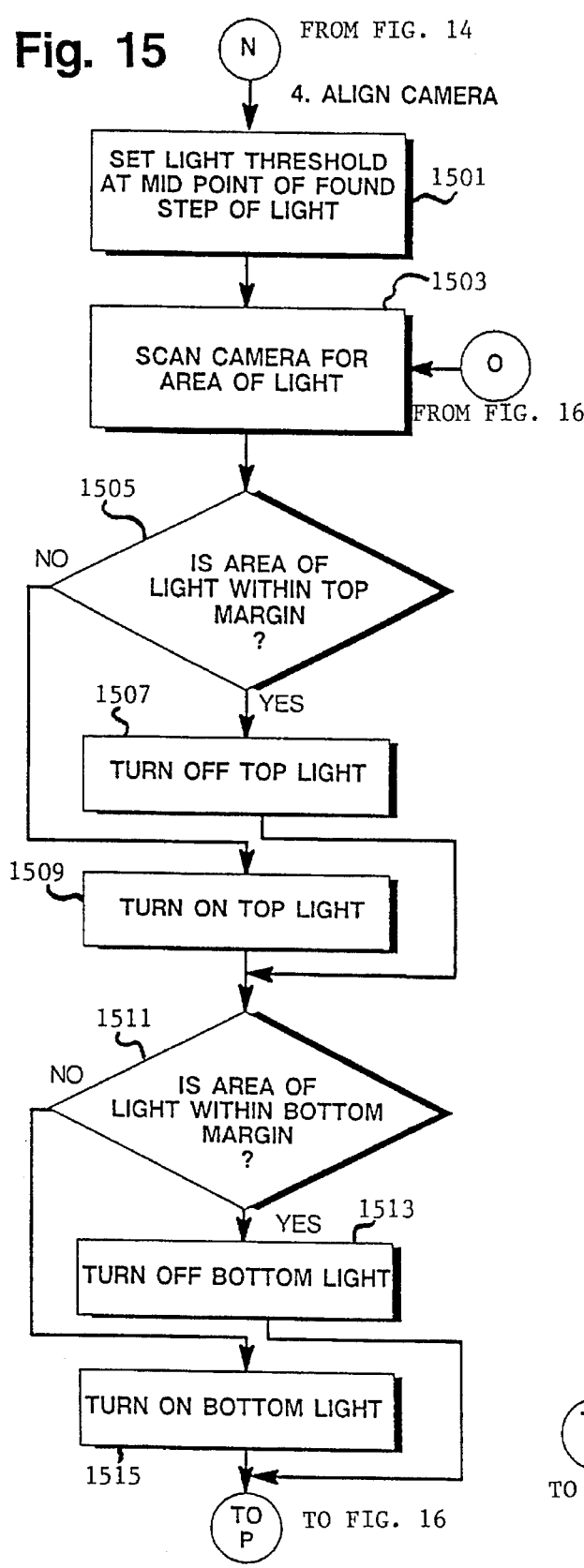

The algorithm firmware 700 starts at a box 901 in FIG. 9, in response to a user actuating switch 83 on the housing unit 31. In response to the actuation of switch 83, the program proceeds to an instruction command 903 which issues a command to the data display system for a full screen high contrast clear image. After issuing the command to the computer 16, the program proceeds to instruction 905 and sets the iris signal or exposure control signal for a maximum exposure time of four frames. The program then advances to instruction box 907 and sets the light threshold level to its maximum level which is expressed as DAC–K. In this regard the digital to analog converter 201 is set to its maximum offset voltage K. After setting the light threshold to its maximum level, the program proceeds to instruction box 909 and sets the blooming level to its maximum. In this regard, the output voltage or bias voltage of the digital to analog converter 202 (FIG. 5) is set to is maximum level. After the blooming level has been set to its maximum level, the program then, advances to instruction box 919 and sets the background light level to its maximum level. In this regard, the reference level signal 578 supplied by digital to analog converter 201 (FIG. 5) is set to its maximum voltage. Once the reference level volt signal has been set to its maximum level, the program then advances to instruction box 921 which commands the image sensor 514 to scan for a light level that is above the set threshold level; e.g., DAC–K. The program then advances to a decision instruction 923 to determine whether a video signal has been produced indicating that light has been found above the threshold level. If light has not been found above the threshold level, the program goes to box G in FIG. 11 to search for a peak of light. Box G allows the program to execute an instruction command in box 1107 to set the light threshold to its maximum at DAC–K4. After setting the light threshold to its maximum DAC–K4 level, the program advances to instruction box 1109 and once again, instructs the CCD image sensor 14 to scan for light above the threshold level. The program then advances to decision box 1111 to determine whether light has been found above the threshold level. If no light has been found, the program advances to instruction box 1113 and reduces the light threshold level by K5. After reducing the light threshold level by K5, the program proceeds to decision box 1115 to determine whether the light is at or below the minimum threshold level. If the light is not at or below the minimum threshold level, the program returns to instruction 1109 and proceeds as described above. If the light is at or below the minimum threshold level, the program proceeds to box H (FIG. 12).

Referring again to FIG. 9, if at decision instruction box 923 light was found above the threshold level, the program advances to box E in FIG. 10. From box E the program proceeds to decision instruction 1001 and determines whether the background level is at a minimum. If the background level is not at a minimum, the program advances to instruction box 1003 and lowers the background level by K2. After lowering the background level to K2, the program goes to box D which returns to instruction 921 in FIG. 9. At instruction 921, the program again causes the image sensor 14 to scan to determine whether the detected light is above the set threshold level and proceeds as previously described.

At decision instruction 1001 in FIG. 10, if the background level is at a minimum, the program advances to decision instruction 1005 to determine whether the blooming level is at a maximum. If the blooming level is not at a maximum, the program advances to command instruction 1007 and lower the blooming level by K3 and then goes to box D and again executes instruction 921 in FIG. 9. If at decision box 1005 in FIG. 10 the blooming level is determined to be set at a maximum level, the program advances to box F in FIG. 11. From box F in FIG. 11, the program executes a decision instruction 1103 to determine whether the exposure time has been set at a two frame period. If the exposure time has not been set to a two frame period, the program advances to instruction box 1105 and set the exposure time for two frame periods and then goes to box C returning to FIG. 9 at instruction 921. The program then proceeds as previously described.

Referring again to FIG. 11, at the decision box 1103, if the exposure time has already been set to a two frame time period, the program goes to box G which allows command instruction 1107 to be executed for the purpose of again search for a peak of light. At box 1107, the program sets the light threshold to the maximum DAC−K4 level and then advances to command instruction 1109 where the image sensor 14 is instructed to scan for light above the threshold level. After instructing the camera to scan for the light above the threshold level, the program advances to decision box 1111 to determine whether light has been found above the threshold level. If no light is found above the threshold level, the program proceeds to command instruction 1113 and reduces the light threshold by the K5 amount. After inducing the light threshold level by the K5 level, the program goes to decision box 1115 to determine whether the light is at or below the minimum threshold level. If the light is not at or below the minimum threshold level, the program returns to instruction box 1109 and proceeds as previously described.

Referring again to FIGS. 11 and 12 at decision instruction 1111, if light is found above the threshold level, the program advances to box H of FIG. 12. At box H of FIG. 12, the program searches for a step of light. In this regard, the program proceeds to execute instruction 1201 and saves the threshold value for peak light and then advances to instruction box 1203. At instruction 1203 the program saves the step size and its threshold as none. After saving the step size, the program advances to command instruction 1205 and sets the light threshold level to its minimum level at DAC+K5. After setting the light threshold to its minimum level at DAC+K5, the program advances to command instruction 1207 where it saves the area of light as none and then proceeds to command instruction 1209. At the instruction 1209, the sensor 14 is commanded to scan for an area of light. The program then advances to decision instruction 1211 to determine whether a new area of light has been found at a out the same level as that saved. If no new area of light has been found, the program goes to box K in FIG. 13.

Referring to FIG. 13, at box K, the program proceeds to decision instruction 1301 to determine whether it was about the same area of light found for more than one threshold. If it was not, the program goes to box L and causes the execution of command instruction 1309 which increases the light threshold level by K6. After setting the light threshold level by K6, the program advances to decision instruction 1311 to determine whether the threshold level is at or above the saved peak threshold level. If the peak level is not, the program goes to box J in FIG. 12 and causes the command instruction 1209 to be executed again. The program then proceeds from instruction 1209 as previously described.

If the threshold level is at or above the saved peak threshold level, the program goes to box M in FIG. 14.

Referring again to decision instruction 1301 in FIG. 13, if the area of light was about the same, the program advances to decision box 1303 to determine whether the saved light area is within the maximum and minimum levels. If the light is not, the program goes to box L and proceeds as previously described. If the area is within the maximum and minimum levels, the program advances to decision instruction 1305 to determine whether the step of light saved is larger. If it is not the program goes to box L and proceeds as previously described. If the step is large, the program proceeds to an instruction 1307. At box 1307 the program saves the new step size and the threshold at the midpoint of the step. After executing the instruction at 1307, the program goes to box 1309 and increases the light threshold by K6. The program then proceeds as previously described. From box M in FIG. 14, the program executes the decision instruction 1401 to determine whether a step of light was found. If the light was not a step of light, the program goes to decision instruction 1403 and tries to find a step of light for K7 a predetermined number of times. If no step of light is found for K7 after a predetermined number of times, the program returns to box G in FIG. 11 and proceeds from instruction 1107, as previously described.

Referring again to FIG. 14, if at decision instruction 1403 the step of light was found, the program proceeds from decision instruction 1403 to command instruction 1405 and toggles the exposure time between two and four frames. The program then goes to decision instruction 1407 and tries to find a step of light at both of the exposure rates. If a step of light is found at both of the exposure rates, the program then proceeds to command instruction box 1409 and causes the microprocessor 549 to generate a signal for making a sound to inform the user that there is too much light or that the camera needs to be moved. After sounding the alarm, the program returns to box A to wait for a new command from the user. If at decision instruction 1407 the program finds that it was not able to find a step of light at both exposures, the program goes to box B returning to instruction 907 in FIG. 9 and proceeds as previously described.

Considering again, decision instruction 1401 in FIG. 14, if a step of light was found, the program proceeds from decision instruction 1401 to box N in order to align the camera. At box N the program advances to command instruction 1501 and sets the light threshold at the midpoint of the found step of light. After setting the light threshold at the midpoint of the found step of light, the program goes to command instruction 1503 and scans for a new area of light.

After initiating the scanning instruction for a new area of light, the program proceeds to decision instruction 1505 to determine whether the area of light is within the top margin. If the area of light is within the top margin, the program proceeds to command instruction 1507 to turn off the top light. After turning off the top light at instruction 1507, the program proceeds to decision instruction 1511 to determine whether the area of 1 light is within the bottom margin. If the area of light is within the bottom margin, the program proceeds to instruction 1513 and turns off the bottom light. After turning off the bottom light, the program then goes to box P in FIG. 16.

At decision instruction 1505, if the area of light was not within the top margin, the program advances to command instruction 1509 and turns on the top light. After turning on the top light, the program advances to decision instruction 1511 to determine whether the area of light is within the bottom margin. If the area of light is not within the bottom margin, the program proceeds to command instruction 1515 and turns on the bottom light. After turning on the bottom light, the program goes to box P in FIG. 16.

Figure 16:
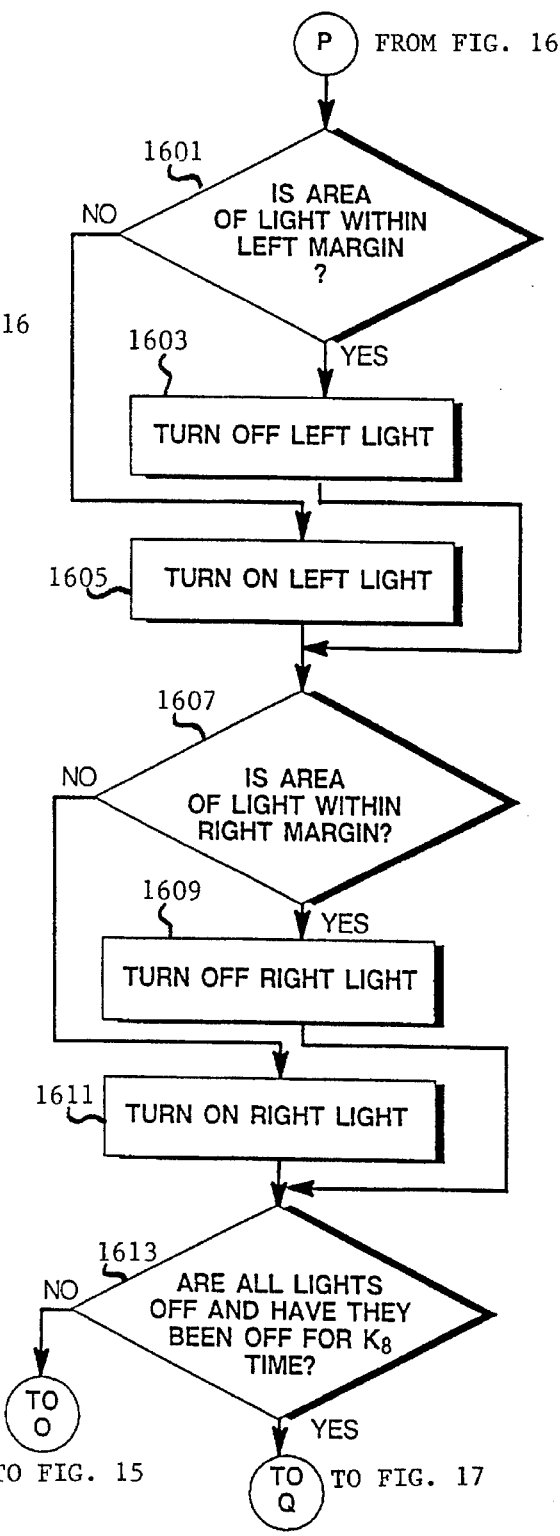

From box P in FIG. 16, the program causes the decision instruction 1601 to be executed to determine whether the area of light is within the left margin. If the area of light is within the left margin, the program advances to command instruction 1603 and turns off the left light. After turning off the left light, the program goes to decision instruction 1607 to determine whether the area of light is within the right margin. If the area of light is within the right margin, the program advances to command instruction 1609 and turns off the right light. After turning off the right light, the program goes to decision instruction 1613 to determine whether all of the lights are off and whether they have been off for more than a K8 period of time. If they have not been off for more than a period of K8 time, or all of the lights are not off, the program returns to box O in FIG. 15 and once again executes command instruction 1503 proceeding as previously described. If all of the lights have been off for more then K8 period of time, the program goes to box Q in FIG. 17.

Considering, once again, decision instruction 1601 in FIG. 16, if the area of light is not within the left margin, the program advances to command instruction 1605 and turns on the left light. After turning on the left light the program then advances to decision box 1607 to determine whether the area of light is within the right margin. If the area of light is not within the right margin, the program then proceeds to command instruction 1611 and turns on the right light. After turning on the right light, the program proceeds to box 1613 and proceeds as previously described.

Figures 17, 18:
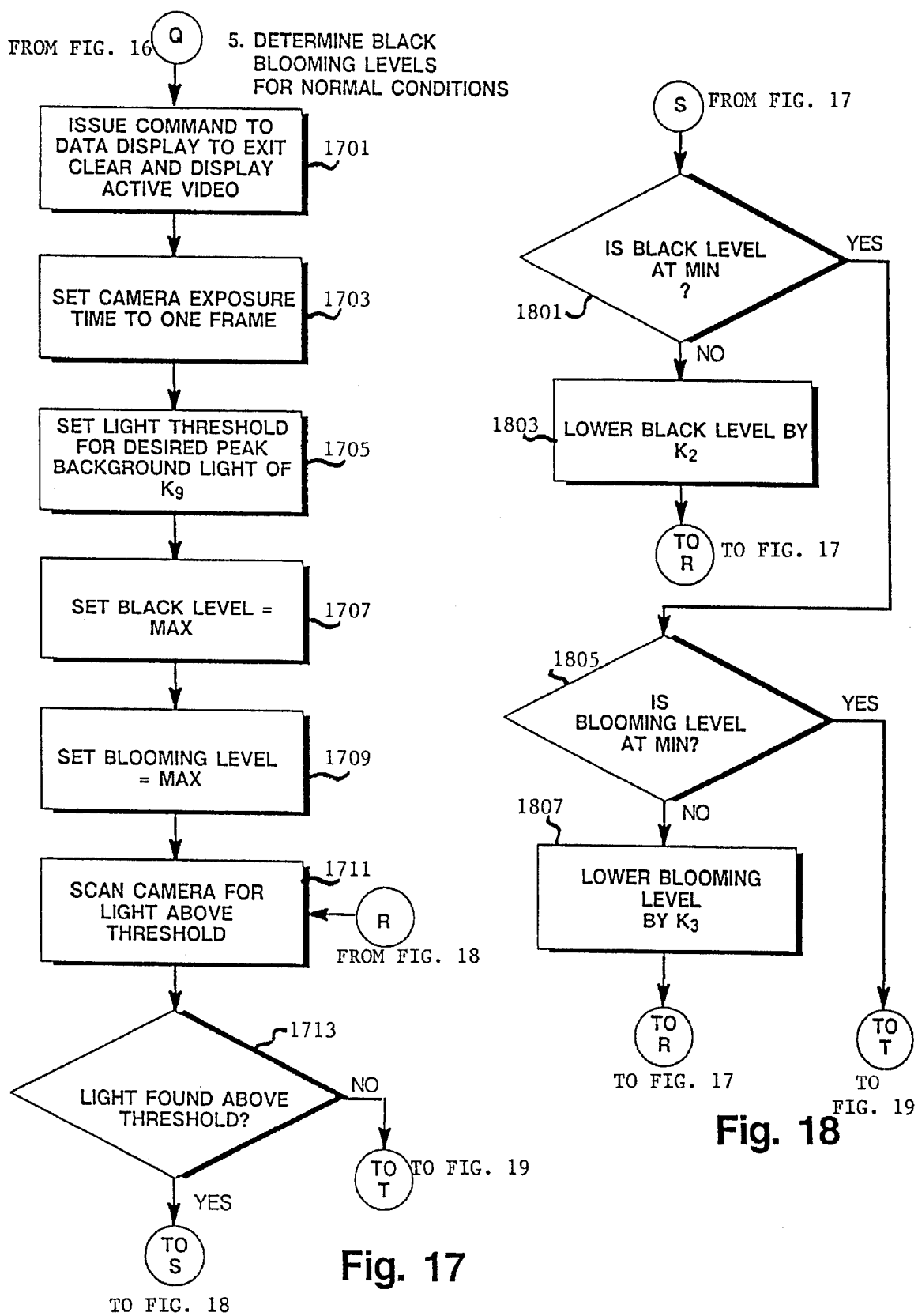

As best seen in FIG. 17, at box Q, the program determines whether the background level and blooming levels are for normal conditions. In this regard, the program proceeding to instruction 1701 to issue a command to the data display to exit the clear mode and to display an active video image. After issuing the command to the computer 16, the program proceeds to command instruction 1703 to set the IRIS or exposure time to one frame. The program then proceeds to command instruction 1705 and sets the light threshold for a desired peak background light of K9. After setting the desired peak background light of K9, the program goes to command instruction 1707 and sets the background level to its maximum level. After setting the background level at maximum, the program then proceeds to the command instruction 1709 and sets the blooming level to its maximum level. After setting the blooming level to its maximum level, the program advances to command instruction 1711 and causes the image sensor device 14 to scan for light. The program then goes to decision instruction 1713 to determine whether light was found above the threshold level. If light was found above the threshold level, the program goes to box S in FIG. 18 and executes a decision instruction 1801 to determine whether the black level is at its minimum. If the black level is not at its minimum, the program goes to command instruction 1803 and lowers the black level by K2 level. After lowering the black background level by the K2 level, the program advances to box R in FIG. 17 to execute command instruction 1711 as previously described.

Figure 19:
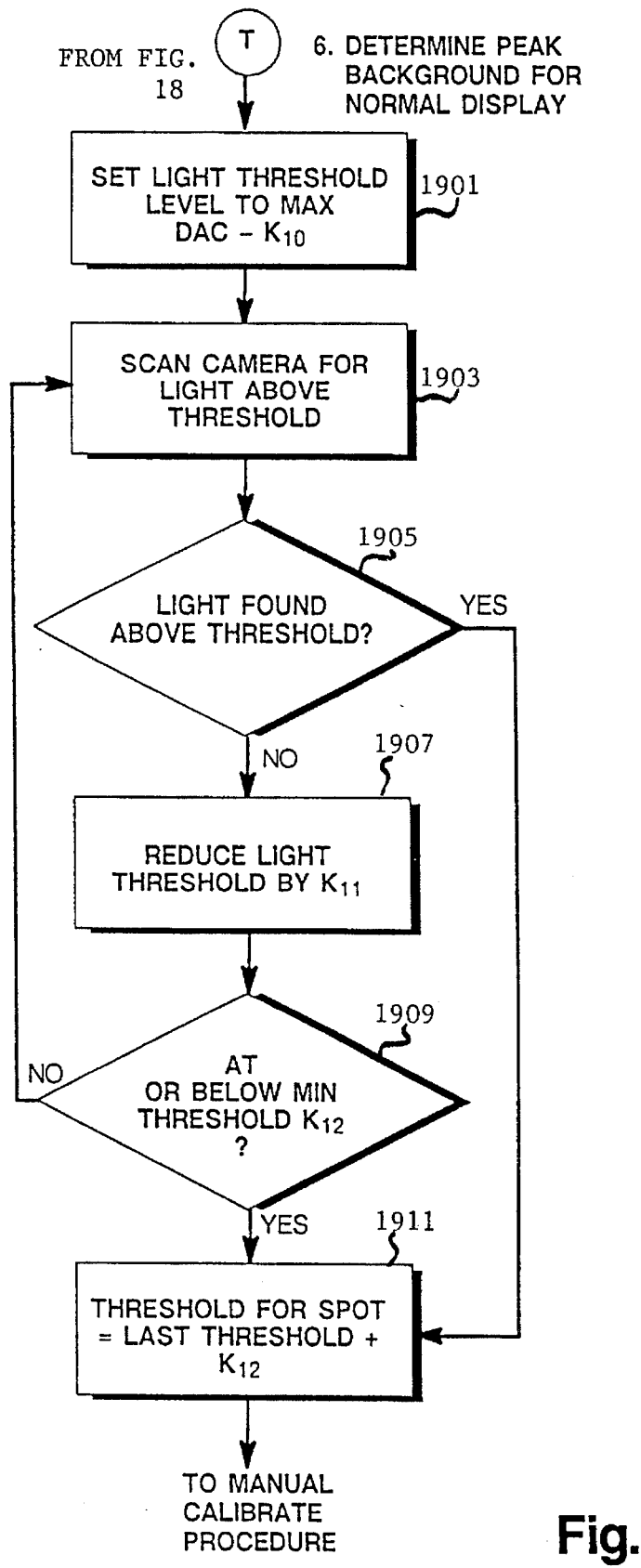

Referring again to FIG. 17, at decision instruction 1713 if light is not found above the threshold level, the program proceeds to box T of FIG. 19. At box T the program determines whether the peak background is for the normal display and causes the command instruction 1901 to be executed. Command instruction 1901 sets the light threshold level to its maximum at DAC–K10. After setting the light threshold to its level, the program proceeds to command instruction 1903 and once again scans for light above the set threshold level. The program then advances to decision instruction 1905 to determine whether light was found above the threshold level. If light was found above the threshold level, the program advances to command instruction 1911 and sets the threshold for a spot equal to the last threshold level plus K12. After setting the threshold for a spot equal to the last threshold plus K12, the program then proceeds to the manual calibration procedure as previously described in the parent application Ser. No. 073,029.

Referring again to FIG. 19, decision instruction 1905, if light is not found above the threshold level, the program proceeds to command instruction 1907. At command instruction 1907, the program causes the threshold level light to be reduced by K11. After reducing the threshold level by K11, the program proceeds to decision instruction 1909 to determine whether the light is at or below the minimum threshold level K12. If the light is not at or below the minimum threshold level K12, the program returns to command instruction 1903 and proceeds as previously described. If the light is at or below the minimum threshold level K12, the program then advances to instruction 1911 and proceeds as previously described.

Referring now to FIG. 18 at decision instruction 1805, if it is determined that the blooming level is not set at its minimum level, the program proceeds to command instruction 1807. At command instruction 1807, the blooming level is lowered by K3. The program then goes to box R in FIG. 17 causing instruction 1711 to be executed as previously described.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

While the preferred embodiment of the present invention is adapted for use with an overhead projector, it will be understood by those skilled in the art that any similar type of display device could be used, such as a slide projector, an integrated projector, a large screen television set or a computer monitor.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. An optical input system calibration apparatus for facilitating alignment with an image reflected from a viewing surface, comprising;

a single light sensing device for detecting the presence of light produced from an image reflecting from the viewing surface;

means for mounting said single light sensing device for universal movement relative to said viewing surface;

detecting means for determining whether the entire reflected image from the viewing surface can be detected and for generating a plurality of electrical signals indicative of the direction of any miscalibration;

indicating means responsive to said signals for providing indications of miscalibration directions when the entire reflected image on the viewing surface can not be detected to indicate the direction of movement of said sensing device so that it can be adjusted positionally until it detects substantially the entire reflected image; and wherein said means for mounting includes a housing for confining said single light sensing device, stationary means for supporting said housing from below, and a universal mounting device disposed between said stationary means and said housing for enabling universal movement of said light sensing device relative to said viewing surface.

2. An optical input system calibration apparatus according to claim 1, wherein said indicating means includes:

right indicating means for providing indications of a rightwardly movement direction to reposition said light sensing means to a corrected position so that it receives substantially the entire reflected image reflecting from said viewing surface;

left indicating means for providing indications of a leftwardly movement direction to reposition said light sensing means to a corrected position so that it receives substantially the entire reflected image reflecting from said viewing surface;

top indicating means for providing indications of an upwardly movement direction to reposition said light sensing means to a corrected position so that it receives substantially the entire reflected image reflecting from said viewing surface; and bottom indicating means for providing indications of a downwardly movement direction to reposition said light sensing means to a corrected position so that it receives substantially the entire reflected image reflecting from said viewing surface.

3. An optical input system calibration apparatus, according to claim 2, wherein said right indicating means is a light emitting diode.

4. An optical calibration apparatus, according to claim 2, wherein said left indicating means is a light emitting diode.

5. An optical input system calibration apparatus, according to claim 2, wherein said top indicating means is a light emitting diode.

6. An optical input system calibration apparatus, according to claim 2, wherein said bottom indicating means is a light emitting diode.

7. An optical input system calibration apparatus according to claim 1, wherein said indicating means includes:

means responsive to said light sensing means for generating electrical signals indicative of detected corner positions of the image reflecting from the viewing surface;

alignment means responsive to said electrical signals for determining direction movement required to detect currently undetected corner portions of the image reflecting from the viewing surface; and microprocessor means responsive to said alignment means for causing alignment signals to be generated, said alignment signals being indicative of movement directions for repositioning said light sensing means to a corrected position so it receives substantially the entire image reflecting from said viewing surface.

8. A calibration apparatus according to claim 1 for use with overhead projector display means, wherein said stationary means includes a base member, said base member being supported from below by the overhead projector display means.

9. An optical system apparatus according to claim 8, wherein said universal mounting means includes:

support means adapted to be mounted to said base member, said support means including a socket disposed therein; and ball means adapted to be received and supported in a universal manner within said socket means to permit said housing to be adjusted positionally relative to said viewing surface.

10. An optical input system apparatus according to claim 9, wherein said socket includes a base portion with an elongated slot.

11. An optical input system apparatus according to claim 10, wherein in said elongated slot extends in an arcuate manner longitudinally along said base portion.

12. An optical input system apparatus according to claim 10, wherein said ball means includes a bottom portion with a threaded rod extending outwardly therefrom.

13. An optical input system apparatus according to claim 12, wherein said threaded rod depends from said bottom portion inclined from the vertical by an angle of about 30 degrees.

14. An optical input system apparatus according to claim 13, wherein said threaded rod is adapted to be mounted slidable within said elongated slot to enable said ball means to move along an arcuate path defined by said slot.

15. An optical input system apparatus according to claim 14, wherein said socket and ball means cooperate with said rod and said elongated slot to permit about a 30 degree up and down pitch movement of said housing between a 0 degree horizontal reference and about an upwardly inclined reference position of about 30 degrees to the horizontal.

16. An optical input system apparatus according to claim 15, wherein said up and down path movements are infinitely variable between said 0 degree horizontal reference and said 30 degree upwardly inclined reference.

17. A method of calibrating an optical input system including image projection means for causing a computer generated video image to be projected onto a remote viewing surface and image detection means having a field of view, said image detection means responsive to the video image reflecting from the remote viewing surface for generating a calibration signal indicative of a given portion of the computer generated video image, said method of calibration comprising:

generating an initiation signal to cause a computer generated calibration image to be projected onto the remote viewing surface;

responding to said initiation signal and to the calibration signal for determining whether or not the field of view of the image detection means is misaligned relative to said calibration image;

generating movement direction signals indicative of movement directions to reposition the image detection means to an aligned position so that it receives given portions of the calibration image reflecting from the remote viewing surface; and responding to the movement direction signals for providing a user with indications of movement directions to reposition the image detection means to said aligned position;

whereby an indication is provided to the user when the image detection means is aligned to a correction position so that it receives substantially the entire calibration image reflecting from the remote viewing surface.

18. A method of calibrating an optical input system;

using a single light sensing device mounted for universal movement relative to a viewing surface to detect light reflecting from said surface;

detecting the presence of light produced from an image reflecting from the viewing surface;

determining whether the entire reflected image from the viewing surface can be detected;

generating a plurality of electrical signals indicative of the direction of any miscalibration;

responding to said signals for providing indications of miscalibration directions when the entire reflected image on the viewing surface can not be detected to indicate the direction of movement of said sensing device so that it can be adjusted positionally until it detects substantially the entire reflected image.

19. A method of calibrating an optical input system according to claim 18, said system including overhead projector display means, further comprising:

using a housing for confining said single light sensing means;

mounting a stationary base member to the overhead projector display means for helping to support said housing from below;

disposing a universal mounting device between said housing and said stationary base members for enabling universal movement of said light sensing device relative to said viewing surface; and supporting the overhead projector display means from below on a stationary surface.

* * * * *